US009165327B1

(12) United States Patent
Hyndman et al.

(10) Patent No.: US 9,165,327 B1
(45) Date of Patent: Oct. 20, 2015

(54) METHOD AND APPARATUS FOR MANAGING BUSINESS AND SOCIAL CONTACTS

(75) Inventors: Arn Hyndman, Ottawa (CA); Malgorzata Hyndman, Ottawa (CA); Nicholas Sauriol, Ottawa (CA)

(73) Assignee: Apple Inc., Cupertino, CA (US)

( * ) Notice: Subject to any disclaimer, the term of this patent is extended or adjusted under 35 U.S.C. 154(b) by 1105 days.

(21) Appl. No.: 12/344,478

(22) Filed: Dec. 27, 2008

(51) Int. Cl.

| | |
|---|---|
| ***G06Q 30/02*** | (2012.01) |
| ***G06Q 10/10*** | (2012.01) |
| ***G06Q 10/06*** | (2012.01) |
| ***G06Q 30/06*** | (2012.01) |
| ***G06Q 10/08*** | (2012.01) |
| ***G06Q 50/00*** | (2012.01) |

(52) U.S. Cl.
CPC .................................... *G06Q 50/01* (2013.01)

(58) Field of Classification Search
USPC .................................................. 705/1.1–912
See application file for complete search history.

(56) References Cited

U.S. PATENT DOCUMENTS

| | | | | |
|---|---|---|---|---|
| 6,868,451 | B1 * | 3/2005 | Peacock | 709/231 |
| 7,249,182 | B1 * | 7/2007 | Heinonen et al. | 709/227 |
| 7,440,746 | B1 * | 10/2008 | Swan | 455/412.1 |
| 7,450,966 | B2 * | 11/2008 | Vanska et al. | 455/558 |
| 2002/0116396 | A1 * | 8/2002 | Somers et al. | 707/200 |
| 2007/0102521 | A1 * | 5/2007 | Petersson | 235/462.1 |
| 2007/0129959 | A1 * | 6/2007 | Bransky et al. | 705/1 |
| 2008/0312946 | A1 * | 12/2008 | Valentine et al. | 705/1 |
| 2009/0181653 | A1 * | 7/2009 | Alharayeri | 455/414.1 |
| 2009/0209202 | A1 * | 8/2009 | Martini et al. | 455/41.2 |
| 2009/0248709 | A1 * | 10/2009 | Fuhrmann et al. | 707/100 |
| 2009/0300549 | A1 * | 12/2009 | Wang et al. | 715/835 |
| 2010/0056173 | A1 * | 3/2010 | Bloom et al. | 455/456.1 |
| 2010/0130128 | A1 * | 5/2010 | Liao | 455/41.2 |
| 2010/0138481 | A1 * | 6/2010 | Behrens | 709/203 |
| 2011/0074554 | A1 * | 3/2011 | Sherman | 340/10.1 |
| 2013/0115879 | A1 * | 5/2013 | Wilson et al. | 455/41.1 |
| 2013/0196599 | A1 * | 8/2013 | Ramsten et al. | 455/41.1 |

* cited by examiner

*Primary Examiner* — Jonathan Ouellette
(74) *Attorney, Agent, or Firm* — Meyertons, Hood, Kivlin, Kowert & Goetzel, P.C.

(57) ABSTRACT

A handheld electronic device includes one or more networking applications that enables the handheld electronic devices to be used as a networking device. The networking application monitors the types of contact that the user has with individuals, the frequency of contact, and type of contact, to infer the closeness of the relationships between the user and the contact. The networking application may monitor not only network based contact, but also physical contact between the two individuals. Knowledge of the closeness level may enable the handheld electronic device to classify contacts, so that different contacts may be handled differently by the handheld electronic device. The closeness level may also be used to alert the user to the presence of people that are close contacts. An anonymizing service may be provided to enable communications between people without requiring them to exchange sensitive personal information until the closeness level reaches a particular threshold.

20 Claims, 4 Drawing Sheets

METHOD AND APPARATUS FOR MANAGING BUSINESS AND SOCIAL CONTACTS

CROSS-REFERENCE TO RELATED APPLICATIONS

None

BACKGROUND OF THE INVENTION

1. Field of the Invention

The present invention relates to social networking and, more particularly, to a method and apparatus for managing business and social contacts.

2. Description of the Related Art

People interact with each other in person as well as via communications networks. For example, people can interact by telephone, e-mail, instant message, facsimile, and in other ways. More recently, people have been able to interact with each other in virtual environments. A virtual environment is a computer-generated two or three dimensional environment in which participants are able to interact with each other and with other objects in the virtual environment. One context in which a virtual environment may be used is in connection with gaming, although other uses for virtual environments are also being developed.

As the number of ways to communicate increases, managing contact information becomes more important. There are several contact management systems that enable users to collect contact information such as telephone numbers, instant mail contact numbers, e-mail addresses, mailing address, and other contact information. Other contact management systems are available as well. In a conventional contact management system, when a user meets someone in person or on a network, the user may create a contact for the person to allow the user to store contact information in the contact management system. This contact may be automatically generated, or more typically, may be manually created.

Typically, a contact management system of this nature will run on a desktop or laptop computer. Since people generally don't carry around their desktop/laptop computer, portable handheld electronic devices have been developed which can maintain similar contact information. Example portable handheld devices include cellular telephones and personal data assistants, although other types of portable handheld electronic devices may also be used to manage contact information. The portable handheld electronic devices often are able to synchronize with the user's desktop or laptop computer so that contacts entered in the portable handheld device are populated to the desktop/laptop, and vice versa.

Although contact management systems have become fairly sophisticated, it would be advantageous to provide a system that has additional intelligence to enable contacts to be managed in a more natural manner that relies less on manual input and more on system intelligence.

SUMMARY OF THE INVENTION

According to an embodiment of the invention, a handheld electronic device includes one or more networking applications that enables the handheld electronic devices to be used as a business and social networking device. The networking application monitors the types of contact that the user has with individuals, the frequency of contact, and type of contact, to infer the closeness of the relationships between the user and the contact. The networking application may monitor not only network based contact, but also physical contact between the two individuals. Knowledge of the closeness level may enable the handheld electronic device to classify contacts, so that different contacts may be handled differently by the handheld electronic device. The closeness level may also be used to alert the user to the presence of people that are close contacts. An anonymizing service may be provided to enable communications between people without requiring them to exchange sensitive personal information until the closeness level reaches a particular threshold.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
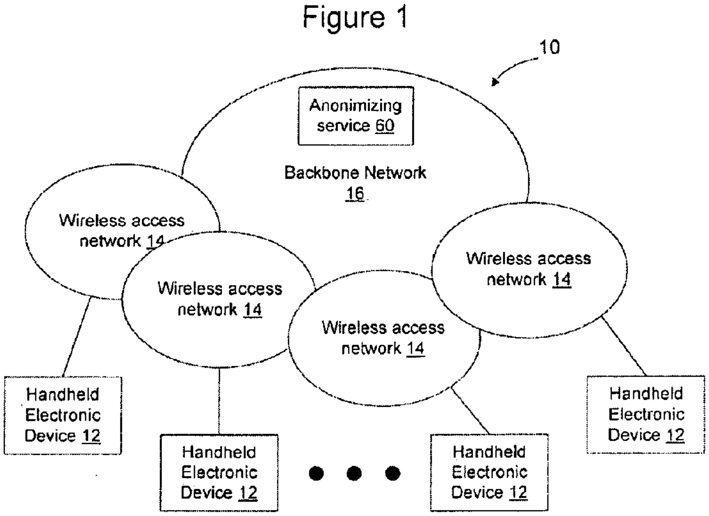
FIG. 1 is a functional block diagram of a portion of an example network that may be used to enable communication sessions to be implemented between users according to an embodiment of the invention.

FIG. 1 shows communication network 10 that may used to enable users to interact with each other via handheld electronic devices 12. The communication network 10 may be implemented as a wireless access network 14 supported by a backbone network 16 or other higher bandwidth infrastructure. The particular network that enables users to engage in wireless communication with each other is incidental to the main purpose of the invention and, accordingly, the invention is not limited by the particular networking technology selected to implement the network 10.

According to an embodiment of the invention, a handheld electronic device includes one or more networking applications that enables the handheld electronic devices to be used as a networking device. The networking application monitors the types of contact that the user has with individuals, the frequency of contact, and type of contact, to infer the closeness of the relationships between the user and the contact. The networking application may monitor not only network based contact, but also physical contact between the two individuals. Knowledge of the closeness level may enable the handheld electronic device to classify contacts, so that different contacts may be handled differently by the handheld electronic device. The closeness level may also be used to alert the user to the presence of people that are close contacts. An anonymizing service may be provided to enable communications between people without requiring them to exchange sensitive personal information until the closeness level reaches a particular threshold.

Figure 2:
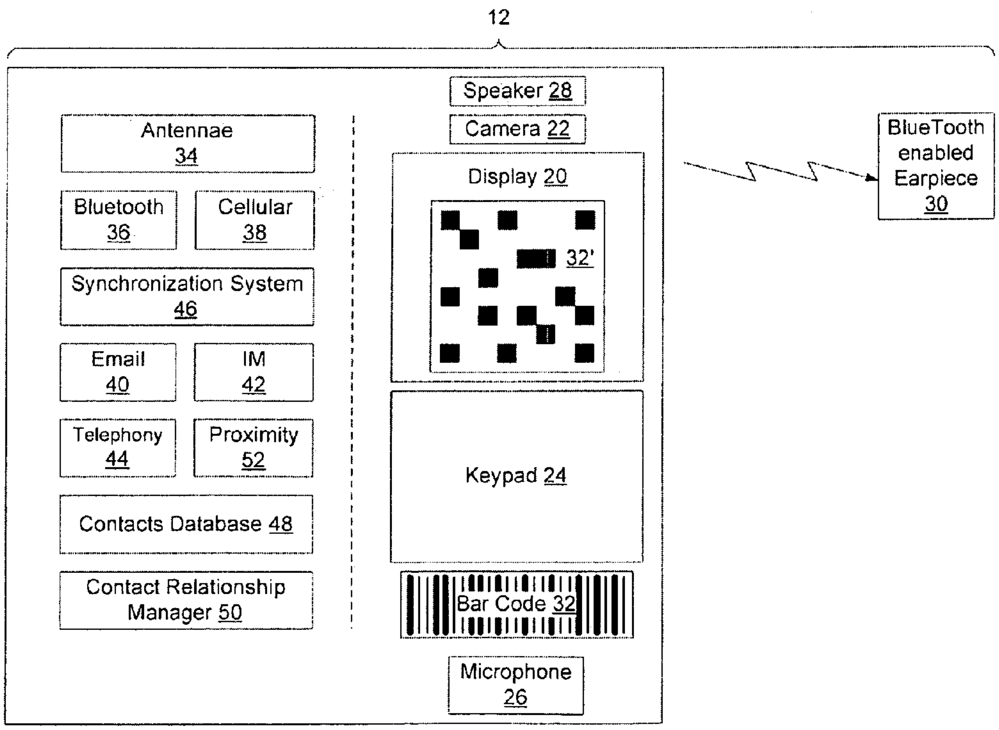
FIG. 2 is a functional block diagram of an example apparatus for managing business and social contacts according to an embodiment of the invention.

FIG. 2 shows an example handheld electronic device according to an embodiment. As shown in FIG. 2, the handheld electronic device 12 includes a display 20, a camera 22, and a keypad 24. The keypad may be physical and include a plurality of keys such as letter/number keys. Alternatively, the keypad may be virtual and accessible via a touch sensitive screen, if such screen is used to implement the display 20. Many different handheld electronic devices have been developed and are likely to be developed in the future. The invention is not limited to use on any particular handheld electronic device. The handheld electronic device will generally include a microphone 26 and a speaker 28 to enable the user to speak with other people and hear other people. Optionally a wired or wireless (e.g. Bluetooth enabled) earpiece 30 may be synchronized with the handheld electronic device to implement the functions of the microphone and speaker.

Other features may be included in the handheld electronic device as well, such as a barcode 32 that enables the handheld electronic device to be identified as discussed in greater detail below. The barcode may be generated to be shown on the display 20 as needed or physically attached to the handheld electronic device. By taking a picture of the bar code, and then analyzing the data from the bar code, basic contact information may be passed from the handheld electronic device that generated the barcode to the handheld electronic device that took the picture.

Bar codes allow binary information to be encoded using one dimensional and two dimensional arrays of contrasting colored areas. A one dimensional bar code commonly includes a plurality of thick and thin black and white lines. Many different two dimensional bar codes have been developed as well, which generally include an array of black and white fields. In the example shown in FIG. 2, an example one dimensional bar code 32 has been shown on a sticker attached to the handheld electronic device and an example two dimensional barcode 32' has been shown as having been shown on the display 20. Two dimensional bar codes have advantages over one dimensional bar codes in that they may be able to represent a larger amount of information within a given amount of area. As discussed below, the bar code may be used to encode information to be transferred between users so that basic contact information or anonymous channel information may be passed from one handheld electronic device to another.

The handheld electronic device includes one or more antennae 34 that will enable the handheld electronic device to communicate on the wireless network 10. In the example handheld electronic device shown in FIG. 2, a Bluetooth application 36 and cellular application 38 are instantiated on the handheld electronic device to enable the handheld electronic device to communicate using the Bluetooth protocol and one or more of the cellular telephony protocols. The Bluetooth and cellular applications may be implemented as software or, more probably, implemented using programmable logic circuitry such as a FPGA.

The handheld electronic device includes one or more communication programs designed to enable the handheld electronic device to be used to communicate on the network 10. In the example shown in FIG. 2, the handheld electronic device includes an e-mail application 40, an instant messaging application 42, and a telephony application 44. Other communication applications may be included as well. The handheld electronic device also includes a synchronization application 46 to enable it to synchronize with a contact management program on a desktop/laptop computer.

The handheld electronic device includes a contacts database 48 that is designed to store information about contacts in the user's network. The type of information stored in the contacts database will be described in greater detail below.

According to an embodiment of the invention, the handheld electronic device includes a contact relationship manager 50, which is an application that will enable the handheld electronic device to be used to implement networking as described in greater detail below. The contact relationship manager 50 may be an expert system or another type of customer software. The contact relationship manager 50 monitors email, instant messaging, telephone calls, physical encounters and other communications between the user and people with entries in the contacts database.

Physical contact may be detected by a proximity application 52, which may obtain proximity information from the Bluetooth, cellular, or other short range wireless applications. For example, the proximity application may detect Bluetooth MAC addresses of neighboring handheld electronic devices and correlate the Bluetooth MAC addresses with MAC addresses of contacts in the contact database. Although Bluetooth MAC addresses have been used to describe an embodiment, other competitive short range wireless technologies such as those being developed as IEEE standard 802.15 may be used as well.

Information from the proximity application 52, email application 40, instant messaging application 42, telephony application 44, and other applications running on the handheld electronic device are fed to the contact relationship manager to enable the contact relationship manager to infer closeness of particular contacts and otherwise to manage the contacts database.

When the user of the handheld electronic device meets someone for the first time, and would like to add them to their social network, the user may enter the contact information into their contacts list via keypad 24. This will cause a new contact entry to be created for the person so that the contact relationship manager may monitor communications with the person over time. Alternatively, the user may tap their handheld electronic device with the other person's handheld electronic device to enable the two handheld electronic devices to exchange contact information. In this embodiment, the Bluetooth near-field communication implemented in the Bluetooth standard version 2.1 may be used to enable basic contact information to be exchanged between the two handheld electronic devices so that a contact may be created for the person in the contacts database.

As an alternative to using the Bluetooth near-field communication (pairing), the contact may instead be created by causing the user to take a picture of a bar code associated with the other person's handheld electronic device. In this example, the user would aim the camera of their handheld electronic device at a bar code on the other person's handheld electronic device and take a picture of the bar code. The bar code includes a one dimensional array of thick and thin lines, or a two dimensional array of contrasting fields that enable a binary code to be extracted. The bar code may be electronically generated and shown on the display or, alternatively, shown on a sticker on the outside of the phone. The binary code may be associated with the identification of the other person's handheld electronic device on the communication network, so that knowledge of the code may enable the user to communicate with the person on the communication network. Optionally, the bar code may be provided by an anonymizing service and associated with an anonymous communication channel (discussed below) that will enable anonymous communication on the network. Although near-field Bluetooth and barcodes are preferred ways of enabling the exchange of contact information, other ways of exchanging contact information may be used as well, such as InfraRed or other types of short range communication.

Enabling the contact to be created automatically enables two people to reliably exchange contact information quickly and effortlessly, even in situations where it may be difficult to do so. For example, in a crowded or noisy area it may be difficult to reliably exchange contact information. By enabling the contact information to be exchanged simply by tapping phones or taking a picture of a bar code, the noise level of the environment is not a factor in reliably obtaining contact information from other people.

As part of establishing contacts, each handheld electronic device will learn the Bluetooth MAC address of the other device. As the user moves about, the user's handheld electronic device will pick up Bluetooth signals from other handheld electronic devices. When the handheld electronic device receives a signal from a handheld electronic device with a recognized MAC address, the handheld electronic device contact relationship manager may be notified to enable the contact relationship manager to deduce that a physical encounter between the two individuals has occurred in the real world. Full Bluetooth pairing is not required to make this inference, as all that is required is recognition of the Bluetooth MAC address.

According to an embodiment of the invention, the contact relationship manager detects when the user is engaged in a face-to-face meeting with someone who has a contact stored in the contacts database. The physical contact between the user and the third party may be inferred by the proximity system by detecting the third party's handheld electronic device via the Bluetooth application 36. The Bluetooth signal strength may be used to approximate the physical separation between the user and the third party. The Bluetooth signal strength may be interpreted as a proxy for physical distance, which may be used to infer the closeness of the social context between the user and the other person. For example, if the handheld electronic device detects that a contact is 12 feet away, the handheld electronic device may determine that the contact is social, but not personal. If the other person is only 4 feet away, the handheld electronic device may determine that a personal meeting is taking place. If the other person is 1.5 feet away, the handheld electronic device may determine that a private meeting is taking place. The distance values associated with determining different types of meetings may be adjusted depending on the preferences of the user. The type of encounter may be stored along with an indication that the encounter occurred.

As the user meets the other person in other contexts, and communicates with the person via e-mail, instant messaging, telephone, or in other ways, the contact frequency, type, and duration, as well as the physical encounters, will be used by the contact relationship manager 50 to infer a closeness of the relationship. The closeness rating may be used to selectively share personal contact information about the user with the other person or to prompt the user to enable additional contact information to be provided to the other person. Closeness ratings may be used in other ways as well.

Where the handheld electronic device has a GPS or other location determining program, and a map program, the contact relationship manager may track the user's position and note when the user is at a location (i.e. physical address) associated with a contact in the user's contact database.

In addition to enabling the handheld electronic device to discern closeness of particular relationships, the contact relationship manager may also provide a valuable resource to helping the user put contacts in context. For example, when the user meets someone at an unexpected location, the contact relationship manager may pull up the contact for that person from the contacts database and provide the user with information about the last one or last several times the two people have met. The contact relationship manager may also perform this same type of reminder for other types of contact, such as in connection with telephone calls, e-mails, instant messages, and other forms of communication.

Providing a reminder related to the last time the two people have contacted each other enables the user to put the other person in context. For example, if the user met someone at a convention, and then happens to see the same person walking through downtown, the user may recognize the person but not remember the person's name or how they know each other. The handheld electronic device, however, may recognize the person's Bluetooth MAC address of the handheld electronic device, correlate the MAC address with the contact entry in the contact database, and obtain relevant information about the person to be displayed to the user on the display 20.

The handheld electronic device may notify the person when someone else has been recognized. For example, the handheld electronic device may beep or vibrate to alert the person of the presence of the contact. The relevant information may then be displayed on the screen to enable the user to obtain information from the handheld electronic device. Where the person is using the Bluetooth enabled earpiece 30, the handheld electronic device may also provide the user with audio to tell the user the other person's name, occupation, where they last met, etc. This enables the user to appear to have remembered everything about the person because of the seamless prompting provided by the contact relationship manager.

Similarly, where the user receives a phone call from someone that they don't remember, the contact relationship manager may provide them with information about the person who is calling. This may be done automatically or on demand. For example, when a call arrives the contact relationship manager could provide the user with a message similar to caller ID that would say something like "Sue from Joe's bar and grill" rather than simply showing Sue's telephone number.

The contact relationship manager may enable the user to add notes to contacts in the contact database. The notes may be entered manually using the keypad or may be entered orally. The oral notes may be converted to text and stored as a text file or, alternatively, the audio notes may be stored and associated with the contact in the database. Enabling the user to add notes to the contacts enables the user to provide themselves with reminders about the people in the database.

For example, assume that the user is a car salesman and that the user has met a potential car buyer. The user and the potential car buyer may tap handheld electronic devices to enable the user to obtain the potential car buyer's contact information and to create a contact for the potential car buyer. The car salesman may then enter information about the potential sale, such as by dictating the type of car that the person was interested in buying and other information about the person. For example, if the potential car buyer was with his family, the car salesman may wish to add a note to the contact entry to enable the salesman to remember the potential car buyer's spouse's name and kids' names. Similarly, if the potential car buyer had questions that the car salesman couldn't answer, the car salesman could enter a note as a reminder to enable the salesman to provide the information to the potential buyer at a later date.

Assume now that the same potential car buyer returns to the car dealership. The person's presence in the car dealership may be detected by the car salesman's handheld electronic device when it detects the potential car buyer's Bluetooth MAC address. Detecting that the potential car buyer has returned will enable the contact relationship manager to recall the contact for the person from the contacts database. The notes and other information associated with the contact may be provided to the car salesman to enable the car salesman to recall the potential car buyer, be prompted with the type of car the person was interested in buying, and be reminded of any additional information about the person so that the car salesman and potential car buyer may continue where they left off previously. Detecting the customer's return may also be advantageous, by itself, since it will enable the car salesman to approach the potential car buyer before other salesmen in the car dealership do so. In a business where compensation is based at least in part on commission, the ability to recognize returning customers may provide a large advantage to helping a person close a sale, rather than having the sale closed by another salesperson.

The contact relationship manager may work to prompt the user to create contacts as well. For example, the user may call a particular telephone number periodically but not have a database entry for the person associated with the number. Based on the telephone usage, the contact relationship manager may determine that a new database contact entry should be created for the person to enable the person to be added to the user's business or social network. The contact relationship manager will then monitor communication and physical meetings between the user and the people associated with contacts in the social network to enable a closeness level to be assigned to the contacts. Depending on the closeness level, the contact relationship manager will enable different types of personal information to be shared with the other people.

When two people meet for the first time, they may not feel comfortable exchanging a great deal of personal information. According to an embodiment of the invention, a communication channel may be temporarily set up for a particular contact, and information about the communication channel may be exchanged rather than actual contact information. This enables a person to confidently provide a person with a way to contact them, without actually providing any permanent/personal contact information. The communication channels may be established by a network based service, such as the anonymizing service 60 shown in FIG. 1.

As used herein, the term "Anonymous channel" will be used to refer to a communication channel that may be set up between two or more people to enable the people to communicate with each other, but which does not require the two people to provide each other with any real contact information. In one embodiment, the people may each subscribe to a communication channel supported by an anonymizing service. Each person subscribing to the anonymous channel provides the anonymizing service with their contact information so that they may receive events on the anonymous channel. To communicate on the anonymous channel, the person merely needs a channel ID. The channel ID is not real contact information about a person, since it is associated with a particular channel that has been set up by the anonymizing service. The anonymous channel will allow people to communicate with each other even where the people don't know each other's names, phone numbers, email address, instant messaging addresses, or any other personal information about each other. One embodiment of a process that may be used to enable an anonymous communication channel to be established is shown in FIG. 3.

Figure 3:
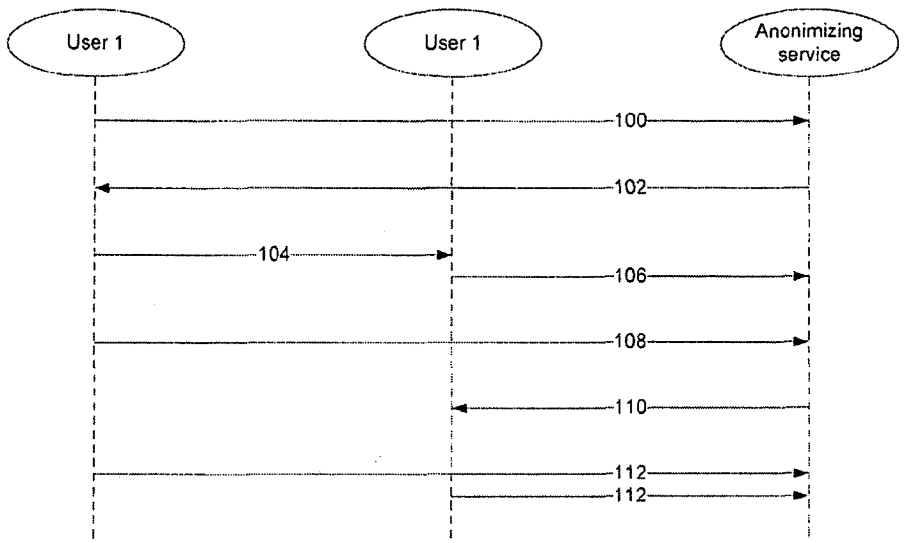
FIG. 3 shows an example process that may be used to implement anonymous communications between the users of the network of FIG. 1 according to an embodiment of the invention.

As shown in FIG. 3, assume that two people have met and would like to be able to communicate with each other. However, the two people may not wish to provide each other with permanent contact information until they get to know each other better. In the example shown in FIG. 3, one of the people (user 1 in this scenario) may send a request (100) for a new anonymous channel to the Anonymizing service 60. The request for an anonymous channel also may serve as a request by the user to register for any events associated with the channel ID that is to be assigned. The original request will contain the requesting user's contact information, such as e-mail address, Instant Messaging address, telephone number, etc. Where the user submitting the request has an account with the anonymizing service, the user may instead submit his account ID and personal identification number or other identifying information. In one embodiment, the identity of the user submitting the request may be obtained from the MAC address of the handheld electronic device.

The Anonymizing service will assign a channel ID to the request and transmit the channel ID back to the user (102). The channel ID will be used by both users to communicate with each other. To enable the other user to communicate on the anonymous channel, the user that has obtained the channel ID will transmit the channel ID to the other user (104). The user may do this by tapping phones with the other person, to enable the channel ID to be exchanged by Bluetooth near-field communication. Alternatively, the anonymizing service may provide the user with a one/two dimensional bar code to be displayed on the user's device. The other user may take a picture of the bar code to obtain the channel ID.

Upon receipt of the channel ID, the other user will send a message to the Anonymizing service to register for events associated with the channel ID (106). When the second person registers for events on the channel, the second person will also provide the Anonymizing service with their contact information such as email address, instant message address, and telephone numbers. Optionally, the second request (from the second person) may be sent to the Anonymizing service automatically upon receipt of the channel ID.

When either of the people that have registered with the channel ID would like to communicate with the other person, the person may use the channel ID rather than the person's actual contact information. For example, assume that the first user would like to send an instant message to the second user. The first user may craft the instant message and send it to the anonymizing service (108) with an indication of the channel ID. The subject of the instant message may contain the channel ID or the channel ID may be carried in another field of the instant message. The anonymizing service will read the channel ID from the message and obtain the actual contact information for the other person, which in this case is the other person's instant messaging address. The anonymizing service will then use the other person's instant messaging address to forward the instant message to the other user (110). Importantly, the anonymizing service will strip out any identifying information from the message headers, etc., to prevent the person that receives the message from learning any actual contact information from the first user.

When an instant message or other communication is received over the anonymous channel, the channel ID may be used to identify the sender using any information the sender gave to the person when the channel was established. For example, the phone may pull up the person's name (if available), an alias (if provided by the other user), or a note entered by the user. Any information that was stored in the contact that is associated with the contact may be recalled and provided to the user to enable the user to identify who the message or other communication is from.

The channel may be used to place telephone calls in the same manner. Specifically, once both parties have registered for a particular channel ID, a user (first person) may place a telephone call to anyone associated with the channel ID (second person) simply by calling the anonymizing service. When the call is connected to the anonymizing service the first person will be prompted to enter the channel ID. Alternatively, the channel ID may be included in a field of the call setup message. The channel ID will enable the anonymizing service to generate a second telephone call to the second person. Once both telephone calls are established, they may be patched together to complete the call between the first person and second person. Optionally, the anonymizing service may cause the name of the second person to be included in the caller-ID field while making the telephone call to the second person. Alternatively, the channel ID may be used by the second person's handheld electronic device to access the first person (calling person's) contact information.

Although an example has been provided in which two people use a shared channel ID to communicate with each other, the invention is not limited in this manner as a channel may be used by more than two people. In this example, anyone subscribed to a channel may add a third or subsequent person to the channel simply by transmitting the channel ID to the new person and causing the new person to subscribe to the channel through the anonymizing service.

A given person may subscribe to multiple anonymous channels. For example, a given person may use a different channel to communicate with each of the contacts. As channel IDs are assigned, they may be stored by the handheld electronic device in the contact database so that the contact relationship manager may work with the email, Instant Messaging (IM), and telephony applications to use the anonymizing service to communicate on the network. Alternatively, a given person may have a single anonymous channel and may hand out keys to people that may be used to communicate via his anonymous channel. The anonymizing service, in this embodiment, would use the keys to determine whether the communication should be allowed on the channel.

One feature of using an anonymous channel to communicate is that either person may elect to stop receiving communications from the other person at any time. For example, as shown in FIG. 3, either person may send a disconnect message 112 to the anonymizing service to cause the anonymizing service to disassociate that user from the communication channel. Where there are two people associated with a channel ID, receiving a disconnect message 112 from either of the people may cause the anonymizing service to disconnect the channel so that no one can use the channel. Where there are three or more people associated with a channel, the disconnect message simply removes that person from the channel so that the person cannot be contacted via the channel. Optionally, whenever a person leaves a channel or when a channel is disconnected entirely, the other people associated with the channel may be notified so that they may update their contacts databases.

Since a person may establish an anonymous communication channel to another person without providing real-life contact information to the other person, the other person has no way of contacting the first person apart from the anonymous communication channel. By enabling the anonymous communication channel to be severed, users can exchange channel ID information freely without worrying about how their personal contact information will be used. Thus, exchanging channel ID information may be safer in some respects than exchanging real-life contact information.

The messages between the users and the anonymizing service may be implemented using instant messaging or other messaging techniques. For example, the instant messaging client 42 on the handheld electronic device may generate an instant message containing the user's contact information automatically upon request by the user for an anonymous channel. Where the anonymizing service already has the user's contact information, the instant message need not contain all of this information, and simply may include identifying information such as a user ID. The other messages may also be implemented using the instant messaging service as well.

As described above, the contact relationship manager on the handheld electronic device enables both on-line and in-person contacts between the user and various other people to be tracked. The information about the contacts may be used by the contact relationship manager to determine a closeness level. Over time, a pattern will emerge that the contact relationship manager may use to determine which people should be treated as close contacts, and which should be treated as casual acquaintances.

Figure 4:
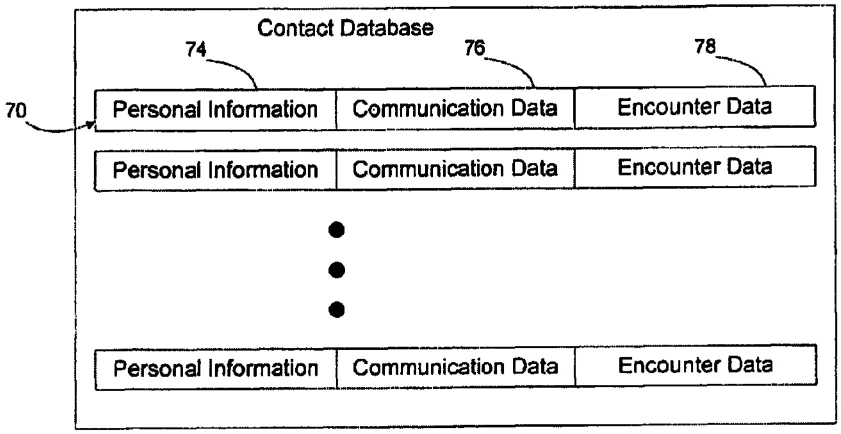
FIG. 4 is a functional block diagram of an example contact database.

FIG. 4 shows an example of a contact database that may be used to store information on the handheld electronic device. Many different types of entries may be used and FIG. 4 is merely intended to show one possible example. In the example shown in FIG. 4, each entry 70 in the contact database includes a field to contain the contact's personal information 74, communication data 76, and encounter data 78.

Figure 5:
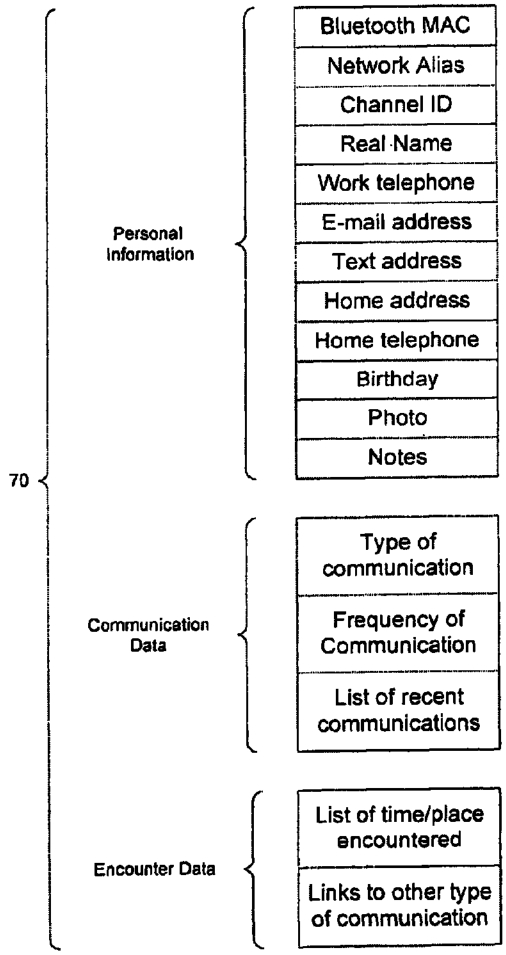
FIG. 5 is a functional block diagram showing information that may be included in the contact database of FIG. 4.

FIG. 5 shows several types of data that may be contained in each of the fields of an example entry 70 of FIG. 4. The contact information may contain any personal information that the user has obtained about the person associated with the contact entry. For example, the personal information may include the person's name, either real or alias—e.g. "person I met at X conference", Bluetooth MAC address, Channel ID, and numerous other types of contact information for the person, such as their telephone number, email address, instant mail address, etc. Optionally, the person may be able to add notes to the entry, which may be stored as part of the personal information.

The communication data 76 contains a record of the past instances where the user has communicated with that person on a network. For example the communication data may contain a list of the type of communication, the frequency of communication, and a list of recent communications in the form of a phone log, e-mail log, IM log. The communication data may be contained in raw or summarized form. The encounter data 78 contains a list of times and places when the person was encountered. Optionally, where the handheld electronic device is GPS enabled, the encounter data may be linked to geography. Particularly if the handheld electronic device is also running a mapping program, the encounter data may be cross-referenced to the map coordinates via the GPS data.

As noted above, the contact relationship manager monitors communication between the handheld electronic device and other people with contacts stored in the contact database. One of the features of the contact relationship manager is the ability to infer how close contacts are to the user, by the frequency of communication and type of communication that occurs between the user and contacts. For example, if the user frequently calls a select group of people and often meets with those people, the contact relationship manager may infer that those people are relatively close contacts to the user. By contrast, if the user rarely calls another contact and never sees the person, then the contact relationship manager may infer that that person does not have as close a relationship with the user.

Figure 6:
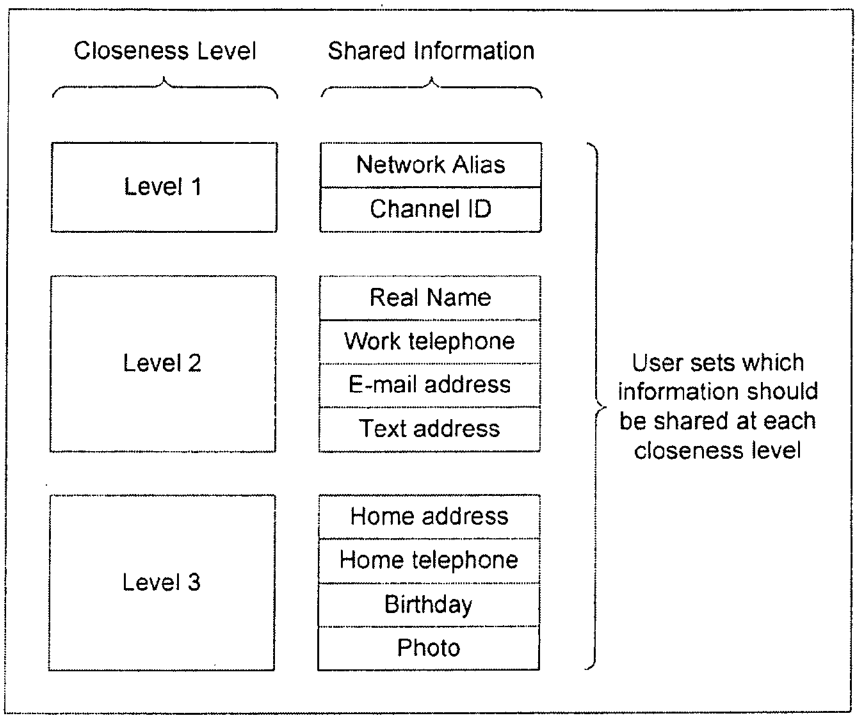
FIG. 6 shows conceptually an example of some types of contact information that may be shared between users depending on the closeness level of the contact as determined by the networking application.

FIG. 6 shows an example of how the contact relationship manager may classify contacts by inferring a closeness level from network based and physical encounters the user has with those individuals. In the example shown in FIG. 6, the contact relationship manager is shown to have three closeness levels (levels 1, 2, and 3) although other levels may be used depending on the particular implementation. Depending on the closeness level, the user may be prompted to share more personal information or to ask for more personal information. This may be automated as well.

In the example shown in FIG. 6, at the lowest level, when the user first meets a new person and creates a contact for the person, the user may want to share an alias and an anonymous channel ID with the new person. As the user has further dealings with the person, i.e. talks with the person, meets the person, exchanges Instant Messages, the user may feel more comfortable providing the person with additional personal contact information. The contact relationship manager may monitor the level of contact that occurs and automatically move the contact from a level 1 contact to a level 2 contact or, alternatively, may prompt the user to ask the user whether the person should be moved up to a level 2 contact. In the illustrated example, once a person is deemed a level 2 contact, the contact relationship manager will enable the person's real name, work telephone, e-mail address, and text address to be transmitted to the other person.

As the relationship between the user and the person develops, the person may be elevated to a level 3 contact. At this level, the person's home address, home telephone number, birthday, photo, and other selected information may be shared with the person. The particular types of information that are shared at the different levels may depend on the particular implementation and the preferences of the user.

Figure 7:
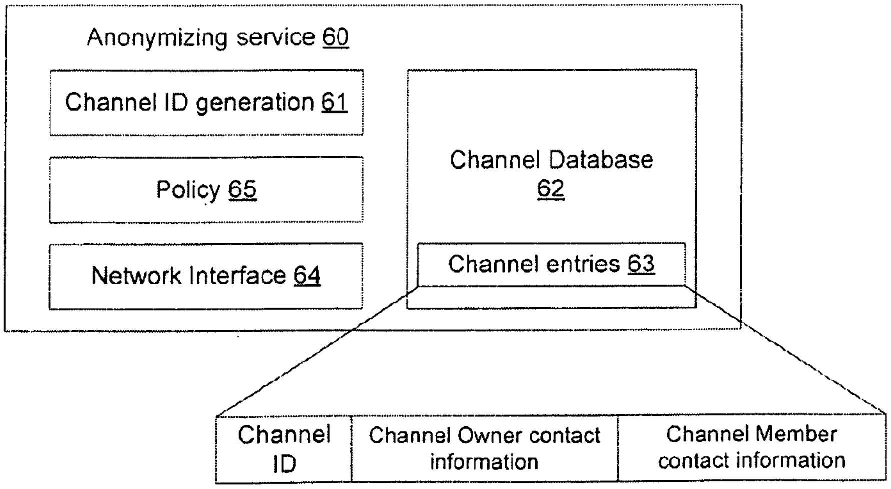
FIG. 7 is a functional block diagram of an anonymizing service that may be used to implement anonymous communication between users of a network such as the example network of FIG. 1.

FIG. 7 shows an example anonymizing service 60 that may be implemented on a server attached to the network. As shown in FIG. 7, the anonymizing service may include a channel generation module 61 configured to receive requests for anonymous channels and create anonymous channels that may be used to enable users of the anonymizing service to communicate with each other. The anonymizing service also has a channel database 62. As channels are created, a channel entry 63 for each channel will be created and stored in the channel database 62. As users subscribe to the anonymous channels, their real-world contact information will be stored in the channel database to enable the anonymizing service to communicate with the users on established communication networks. For example, the channel entries may include the channel ID, the channel owner contact information, and channel member contact information. Other information may be contained in the channel entries as well. As mentioned above, the channel database may alternatively assign a particular channel to a user and then assign keys that may be used on the channel rather than assigning new channels. The keys may be used to communicate with the owner of the channel and may be canceled by either the owner of the channel or the key-holder.

The anonymizing service 60 further includes a network interface 64 to enable it to communicate with users over the network. The network interface may also enable the anonymizing service to interface with other servers that will implement the actual communication services on the network, such as to enable it to interface with an Instant Messaging server, e-mail server, communication server, or other servers that are deployed on the network to enable one user to communicate with another user.

The anonymizing service 60 may include a policy module 65 or other similar control module that will enable the operator to specify how the anonymizing service should operate on the network. Example policies that may be implemented may be to limit the number of simultaneous channels that may owned by a particular user, limit the number of people that may subscribe to a particular channel, limit the length of time that a channel may be used, limit the volume of data that may be transmitted through a channel, and other similar restrictions.

Internet based social networking applications have been emerging, that enable people to create links to people that they know and through which social connections may be located. The anonymizing service described herein may be used in connection with these internet-based social networking applications as well to establish temporary anonymous communication channels between members. This enables members to engage each other socially without requiring the users to exchange permanent contact information. Thus, the anonymizing service is not limited to use with handheld electronic devices, but may also be used in other areas as well. This enables people who don't know each other very well to establish a temporary communication channel without first requiring the users to trust each other sufficiently to exchange personal real-life communication information.

The functions described above may be implemented as one or more sets of program instructions that are stored in a computer readable memory and executed on one or more processors within on one or more computers. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a memory chip, computer memory, memory stick, disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of enabling anonymous communication between handheld electronic devices, the method comprising the steps of:

upon request of a first handheld electronic device, assigning an anonymous channel ID to an anonymous communication channel;

providing the anonymous channel ID to the first handheld electronic device;

associating contact information associated with a user of the first handheld electronic device with the anonymous channel ID;

receiving the anonymous channel ID from a second handheld electronic device, the anonymous channel ID having been provided by the first handheld electronic device to the second user handheld electronic device;

associating contact information associated with a user of the second handheld electronic device with the anonymous channel ID;

enabling the first handheld electronic device and the second handheld electronic device to communicate with each other over the anonymous channel using the anonymous channel ID without exchanging contact information.

2. The method of claim 1, wherein the step of enabling the first handheld electronic device and the second handheld electronic device to communicate with each other over the anonymous channel comprises receiving a communication from the first handheld electronic device, the communication identifying the anonymous channel ID, determining contact information for the user of the second handheld electronic device, and using the contact information of the user of the second handheld electronic device to forward the communication to the second handheld electronic device.

3. The method of claim 2, further comprising the step of removing any contact information associated with the user of the first handheld electronic device other than the anonymous channel ID.

4. The method of claim 1, further comprising the step of enabling the first handheld electronic device to prevent the second handheld electronic device from communicating over the anonymous channel.

5. The method of claim 1, further comprising:

obtaining an identity of the user of the first handheld electronic device from a MAC address of the first handheld electronic device.

6. A non-transitory computer readable memory medium storing program instructions executable by a processor to:

assign, upon request of a first handheld electronic device, an anonymous channel ID to an anonymous communication channel;

provide the anonymous channel ID to the first handheld electronic device;

associate contact information associated with the user of a first handheld electronic device with the anonymous channel ID;

receive the anonymous channel ID from a second handheld electronic device, the anonymous channel ID having been provided by the first handheld electronic device to the second handheld electronic device;

associate contact information associated with the user of a second handheld electronic device with the anonymous channel ID;

enable the first handheld electronic device and the second handheld electronic device to communicate with each other over the anonymous channel using the anonymous channel ID without exchanging contact information.

7. The non-transitory computer readable memory medium of claim 6, wherein to enable the first handheld electronic device and the second handheld electronic device to communicate with each other over the anonymous channel, the program instructions are further executable by the processor to:

receive, from the first handheld electronic device, a communication identifying the anonymous channel ID;

determine contact information for the user of the second handheld electronic device; and use the contact information of the user of the second handheld electronic device to forward the communication to the second handheld electronic device.

8. The non-transitory computer readable memory medium of claim 7, wherein the program instruction are further executable by the processor to:

remove any contact information associated with the user of the first handheld electronic device other than the anonymous channel ID.

9. The non-transitory computer readable memory medium of claim 6, wherein the program instruction are further executable by the processor to:

enable the first handheld electronic device to prevent the second handheld electronic device from communicating over the anonymous channel.

10. The non-transitory computer readable memory medium of claim 6, wherein the program instructions are further executable by the processor to:

receive a disconnect message from the first handheld electronic device; and in response to the disconnect message, disassociate the first handheld electronic device from the anonymous channel, thereby preventing the second handheld electronic device from further communicating with the first handheld electronic device.

11. The non-transitory computer readable memory medium of claim 6, wherein the program instructions are further executable by the processor to:

in response to the disconnect message, notify the second handheld electronic device that the first handheld device has been disassociated from the anonymous channel.

12. The non-transitory computer readable memory medium of claim 6, wherein to enable the first handheld electronic device and the second handheld electronic device to communicate, the program instructions are further executable by the processor to:

communicate with the first and second handheld electronic devices via at least one of an instant message, an email, and a phone call.

13. The non-transitory computer readable memory medium of claim 6, wherein the program instructions are further executable by the processor to:

obtain an identity of the user of the first handheld electronic device from a MAC address of the first handheld electronic device.

14. A server comprising:

a network interface; and a processor coupled to the network interface, wherein the processor is configured to:

receive a request for assignment of an anonymous channel ID from a first handheld electronic device via the network interface;

assign the anonymous channel ID to an anonymous communication channel;

associate contact information associated with a user of the first handheld electronic device with the anonymous channel ID;

provide the anonymous channel ID to the first handheld electronic device via the network interface;

receive the anonymous channel ID from a second handheld electronic device via the network interface, the anonymous channel ID having been provided by the first handheld electronic device to the second handheld electronic device;

associate contact information associated with a user of the second handheld electronic device with the anonymous channel ID; and establish communication between the first handheld electronic device and the second over the anonymous channel using the anonymous channel ID without exchanging contact information.

15. The server of claim 14, wherein to establish communication between the first handheld electronic device and the second handheld electronic device, the processor is further configured to:

receive a communication identifying the anonymous channel ID from the first handheld electronic device;

determine contact information for the user of the second handheld electronic device; and forward the communication to the second handheld electronic device based on the contact information of the user of the second handheld electronic device.

16. The server of claim 14, wherein the processor is further configured to:

remove all contact information associated with the user of the first handheld electronic device other than the anonymous channel ID.

17. The server of claim 14, wherein the processor is further configured to:

receive a disconnect message from the first handheld electronic device; and in response to the disconnect message, disassociate the first handheld electronic device from the anonymous channel, thereby preventing the second handheld electronic device from further communicating with the first handheld electronic device.

18. The server of claim 17, wherein the processor is further configured to:

in response to the disconnect message, notify the second handheld electronic device that the first handheld device has been disassociated from the anonymous channel.

19. The server of claim 14, wherein to establish communication, the processor is further configured to:

communicate with the first and second handheld electronic devices via at least one of an instant message, an email, and a phone call.

20. The server of claim 14, wherein the processor is further configure to:

obtain an identity of the user of the first handheld electronic device from a MAC address of the first handheld electronic device.

* * * * *